(12) United States Patent
Erickson (10) Patent No.: US 11,353,309 B2
(45) Date of Patent: Jun. 7, 2022

(54) CONTROLLERS AND METHODS FOR BULK EXPLOSIVE LOADING SYSTEMS

(71) Applicant: Tradestar Corporation, Salt Lake City, UT (US)

(72) Inventor: Jon Erickson, Salt Lake City, UT (US)

(73) Assignee: Tradestar Corporation, Salt Lake City, UT (US)

( * ) Notice: Subject to any disclaimer, the term of this patent is extended or adjusted under 35 U.S.C. 154(b) by 0 days.

(21) Appl. No.: 16/601,176

(22) Filed: Oct. 14, 2019

(65) Prior Publication Data

US 2020/0116466 A1     Apr. 16, 2020

Related U.S. Application Data

(60) Provisional application No. 62/745,801, filed on Oct. 15, 2018.

(51) Int. Cl.
    *F42D 1/10*     (2006.01)
    *G05D 11/13*     (2006.01)

(52) U.S. Cl.
    CPC .............. *F42D 1/10* (2013.01); *G05D 11/132* (2013.01)

(58) Field of Classification Search
    CPC ........................... G05D 11/13–139; F42D 1/10
    See application file for complete search history.

(56) References Cited

U.S. PATENT DOCUMENTS

| | | | | |
|---|---|---|---|---|
| 4,195,548 A | * | 4/1980 | Cook ..................... | B01F 3/0807 149/109.6 |
| 4,199,262 A | * | 4/1980 | Cribb ................... | B01F 13/0035 366/44 |
| 4,685,375 A | * | 8/1987 | Ross ...................... | B01F 3/1221 149/109.6 |
| 5,811,711 A | * | 9/1998 | Tremblay .................. | F42D 1/10 86/20.15 |

(Continued)

FOREIGN PATENT DOCUMENTS

WO     2015140462     9/2015

OTHER PUBLICATIONS

International Search Report and Written Opinion dated Jul. 16, 2020 for PCT/US2019/056085.

*Primary Examiner* — Joshua T Semick
(74) *Attorney, Agent, or Firm* — Dorsey & Whitney, LLP (57) ABSTRACT

Controllers and methods of bulk explosive loading systems are disclosed. A controller of a bulk explosive loading system includes a communication interface configured to communicate with a human-machine interface (HMI). The HMI is configured to execute a software program configured to enable the HMI to receive user inputs from a user. The controller also includes control outputs to output control signals to electrically controllable components. The controller further includes sensor inputs configured to receive sensor signals from sensors configured to monitor the bulk explosive loading system. The controller also includes a processor configured to process recipe information received (Continued)

from the HMI, generate the control signals based on the recipe information to control the electrically controllable components to blend the mixture, process the sensor signals received during blending of the mixture, and transmit blending information to the HMI device. The blending information includes information regarding the blending of the mixture.

20 Claims, 6 Drawing Sheets

(56) References Cited

U.S. PATENT DOCUMENTS

| | | | |
|---|---|---|---|
| 6,165,297 | A | 12/2000 | Smith et al. |
| 6,188,936 | B1 * | 2/2001 | Maguire ............... B29B 7/94 700/265 |
| 6,644,202 | B1 * | 11/2003 | Duniam ............... F42D 1/055 102/312 |
| 6,851,444 | B1 * | 2/2005 | Kohl ................... E21B 37/06 137/13 |
| 8,014,885 | B2 * | 9/2011 | Hughes ............... G05D 11/139 700/97 |
| 8,261,664 | B2 * | 9/2012 | Von Lengeling ....... F42D 1/10 102/313 |
| 9,638,505 | B2 * | 5/2017 | Halander ............. F42D 1/10 |
| 2002/0088620 | A1 * | 7/2002 | Lerche ............... E21B 43/1185 166/297 |
| 2012/0024181 | A1 | 2/2012 | Von Lengeling et al. |
| 2015/0003186 | A1 | 1/2015 | Xue |
| 2018/0245902 | A1 * | 8/2018 | Oliver ............... G05D 11/132 |

* cited by examiner

CONTROLLERS AND METHODS FOR BULK EXPLOSIVE LOADING SYSTEMS

RELATED APPLICATIONS

This application claims the benefit, under 35 U.S.C. § 119(e), of U.S. Provisional Application No. 62/745,801 filed Oct. 15, 2018, and titled "CONTROLLERS AND METHODS FOR BULK EXPLOSIVE LOADING SYSTEMS," which is hereby incorporated by reference in its entirety.

BACKGROUND

Bulk explosive loading systems sometimes include on-site equipment (e.g., bulk explosive loading systems integrated into trucks) for blending and delivering explosive mixtures. These mixtures may be used in mining and drilling. The explosive nature of these mixtures requires precise, safe procedures for blending the mixtures.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Bulk explosive loading systems provide a safe efficient way to deliver explosives to a target position. Some bulk explosive loading systems may be above ground trucks that deliver explosives into a bore hole. Other bulk explosive loading systems may be vehicles designed to travel underground to deliver explosives into holes within a mine. While the illustrated embodiment herein references a truck, the aspects of the disclosure described below may be applied to other vehicle types.

An operator interacts with a controller associated with the bulk explosive loading system to provide certain parameters for the explosives to be delivered. However, often these controllers feature a user interface that is outdated and difficult to use. Often the user interface is tied directly to the controller making it expensive and difficult to update or replace. Described herein are systems, devices, and methods to provide a user interface that is independent of a controller of the bulk explosive loading system. The user interface may be updatable and reconfigurable intendent of the controller, include more features than the controller, and provide a more robust interface for an operator.

Figure 1:
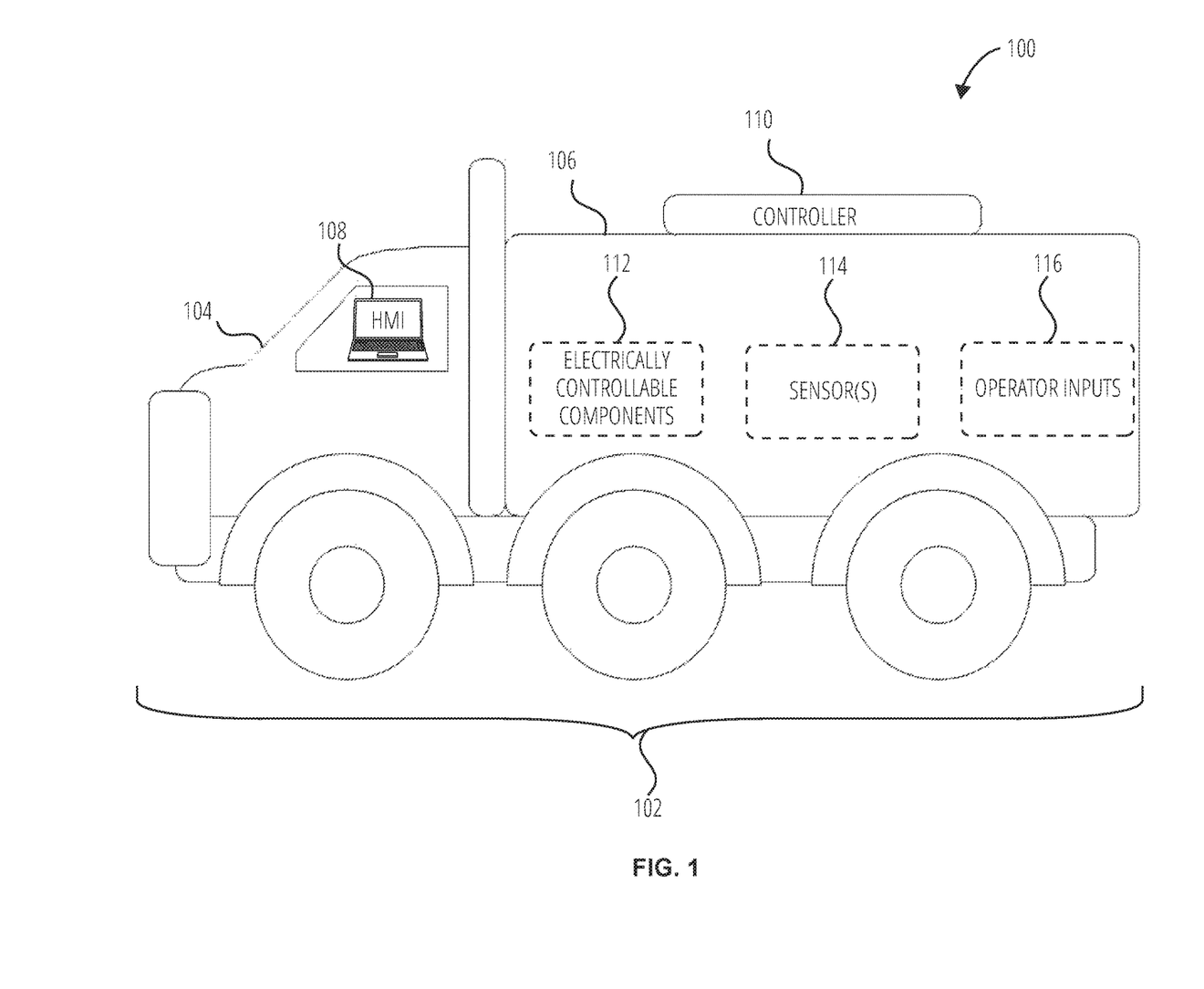
FIG. 1 is a simplified view of a bulk explosive loading system in accordance with some embodiments.

FIG. 1 is a simplified view of a bulk explosive loading system 100 according to some embodiments. The bulk explosive loading system 100 illustrated in FIG. 1 is a mobile bulk explosive loading system. The bulk explosive loading system 100 includes a truck 102 including a truck cab 104 and a truck body 106. The bulk explosive loading system 100 also includes a Human-Machine Interface 108 (HMI 108), which may be located within the truck cab 104. The bulk explosive loading system 100 further includes a controller 110 on or in the truck body 106. The bulk explosive loading system 100 also includes one or more electrically controllable components 112, one or more sensors 114, and one or more operator inputs 116 on or in the truck body 106. For simplicity, the one or more electrically controllable components 112, the one or more sensors 114, and the one or more operator inputs 116 are sometimes referred to herein as "electrically controllable components" 112, "sensors" 114, and "operator inputs" 116, respectively.

The controller 110 is configured to control and monitor blending processing, which includes closed-loop control of one or more ingredients (e.g., an emulsion explosive, dry ammonium nitrate prill, ammonium nitrate and fuel oil (ANFO), etc.) and preparation of one or more ingredients to be delivered to a bore hole or added to a mixture and then delivered to the bore hole. The controller 110 may use the closed-loop control for controlling various equipment, such as, for example, hydraulic valves, controlling pneumatic process valves, controlling electronic process valves, and setting a speed of a mixer. The explosive mixture can have a variety of ingredients, including only one ingredient, post-mixing. For example, the explosive mixture may be an emulsion explosive prepared by the bulk explosive loading system 100. The controller 110 may control sensitizing an emulsion matrix to achieve an emulsion explosive with a desired density in a bore hole. The emulsion explosive can be delivered as a single ingredient blended with other ingredients (e.g., dry ammonium nitrate prill, ANFO (which was also mixed on the truck 102 from separate containers of dry ammonium nitrate prill and fuel oil), energy-enhancing or -reducing agents, etc.). For example, the controller 110 is configured to control the various electrically controllable components 112 to blend and deliver various mixtures (e.g., explosive mixtures or mixtures used in explosives) and receive sensor data from the sensors 114 during the blending and delivery processing. For example, the electrically controllable components 112 may include one or more electrically controllable hydraulic valves (e.g., used to dispense one or more ingredients from ingredient containers into a mixing container at controllable rates); one or more pumps to pump the one or more ingredients into the mixing container or to deploy a mixture into a bore hole; one or more auger motors configured to blend a mixture, deliver viscous ingredients to a mixing container or to deploy the mixture into a bore hole; other electrically controllable components; or combinations thereof. The controller 110 may be configured to transmit one or more control signals to the electrically controllable components 112 and receive one or more sensor signals from the sensors 114 during the blending processing. For example, the sensors 114 may include one or more pressure sensors, one or more temperature sensors, one or more speed sensors of one or more pumps, one or more speed sensors of one or more auger motors, flow meters, level sensors, other sensors, or combinations thereof.

The HMI 108 is configured to record information (e.g., information gathered by the sensors 114) gathered during the blending processing, manage product recipes to be blended, other duties, or combinations thereof. For example, the HMI 108 may be configured to receive user inputs from a user of the bulk explosive loading system 100 to create, modify, or select mixture recipes to be followed by the controller 110, as well as delivery information to enable the controller 110 to properly deliver the mixture to a blast site (e.g., a bore hole). The HMI 108 is also configured to send information (e.g., recipe information, delivery information) to the controller 110 prior to the start of the blending process. Once the information has been sent and verified, the user can start the blending process (e.g., using the HMI and/or operator inputs 116), and the controller 110 reports back to the HMI 108 information regarding the blending process (e.g., an amount delivered, pumping pressures, ingredient delivery rates, etc.). At the conclusion of the blending process the controller 110 updates the HMI 108 with final amounts of each ingredient delivered, which will be stored in a database (e.g., the database 208 of FIG. 2) of the HMI 108. In some embodiments, the HMI 108 may report the information regarding the blending process, the final blending information, the recipe information, the delivery process, other information, or combinations thereof to an outside computing device (e.g., a server configured to collect information from a plurality of bulk explosive loading systems).

Once the controller 110 receives the recipe information from the HMI 108, the controller can perform the blending and delivery of the mixture independent of the HMI 108. As a result, the controller 110 may be capable of performing the blending and delivery even if communication with the HMI 108 is interrupted or otherwise terminated.

The HMI 108 may be located anywhere on or around the bulk explosive loading system 100. For example, in the illustrated embodiment, the location of the HMI 108 is within the truck cab 104. The HMI may be located in a position that may enable the user to interface with the bulk explosive loading system 100 in relative comfort and safety, such as the relative comfort and safety afforded by the truck cab 104. As a result, the user may not be required to access external controls at or near the electrically controllable components 112. In some embodiments, the HMI 108 may be external to the bulk explosive loading system 100. For example, an underground bulk explosive loading equipment may include an HMI near the rear of the equipment for accessibility. Although the HMI 108 enables the user to interface with the bulk explosive loading system 100 within the truck cab 104, the operator inputs 116 may be configured to provide the user with additional and/or redundant (redundant with the user interface options provided by the HMI 108) user interface options for interacting with the bulk explosive loading system 100. By way of non-limiting example, the operator inputs 116 may include a manual override configured to enable the user to override blending and/or delivery of a mixture.

The HMI 108 may be reconfigurable independent of the controller 110. For example, the communications interface between the HMI 108 and the controller 110 may allow the HMI 108 to be replaced or updated without the need to update the controller 110. Additionally, the HMI 108 may be reconfigured based on the user. For example, the HMI 108 may limit access to certain parameters for some users.

Figure 2:
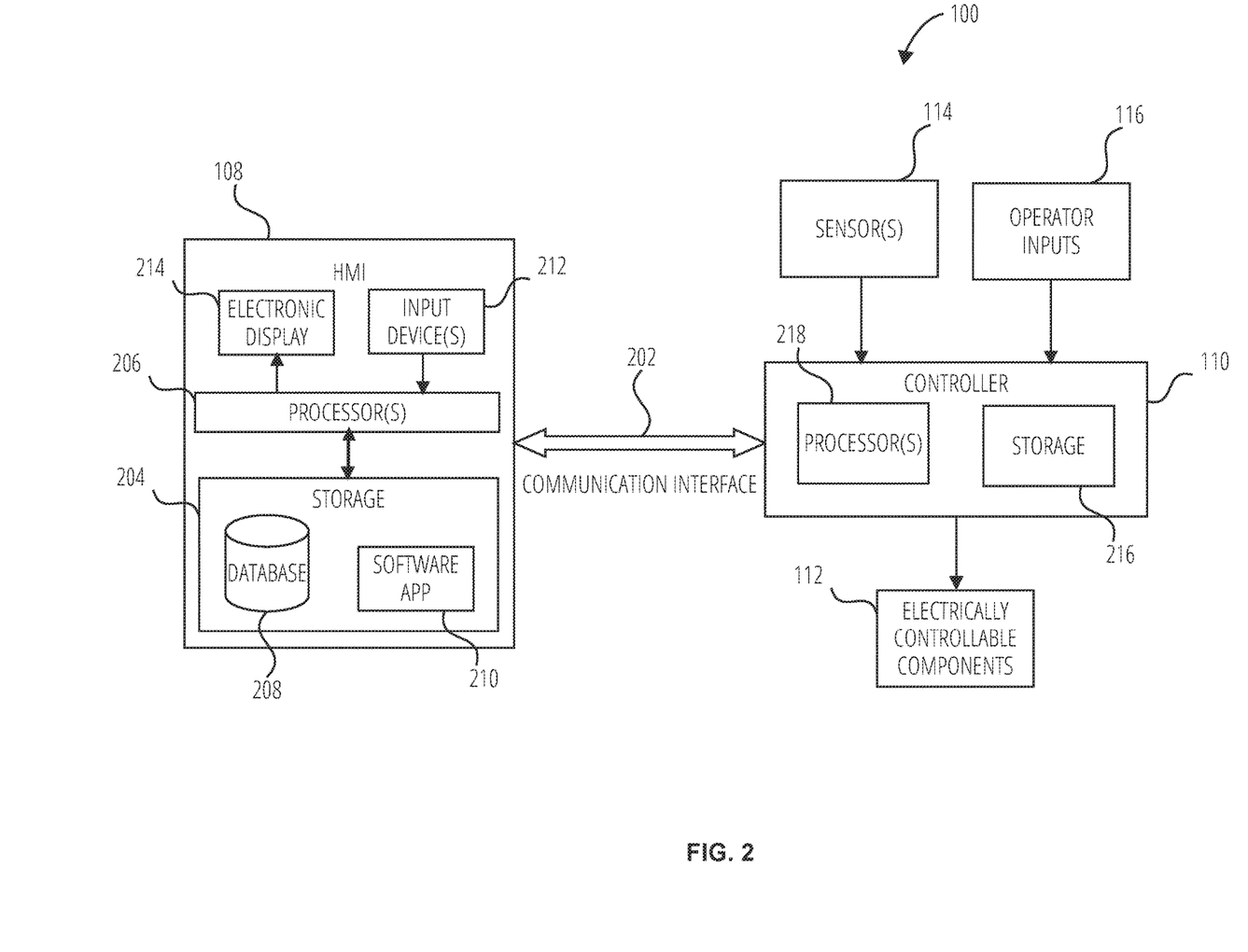
FIG. 2 is a simplified block diagram of the bulk explosive loading system of FIG. 1.

FIG. 2 is a simplified block diagram of the bulk explosive loading system 100 of FIG. 1. As illustrated in FIG. 2, the bulk explosive loading system 100 includes a communication interface 202 configured to enable bi-directional communication between the HMI 108 and the controller 110. In some embodiments the communication interface 202 includes a wired communication interface. By way of non-limiting example, the communication interface 202 includes a two-wire interface such as a Controller Area Network (CAN) bus. Also by way of non-limiting example, the communication interface 202 may include a local area network (LAN) cable such as an Ethernet cable. In some embodiments the communication interface 202 includes a wireless communication interface such as a Bluetooth, Wi-Fi, ZigBee, or cellular communication interface. In some embodiments the communication interface 202 includes a secure wireless communication interface to prevent outside tampering or interference with dangerous mixing and delivery processes controlled by the controller 110. Although in some embodiments the HMI 108 may be capable of communicating (e.g., wirelessly or through wired networks), in some such embodiments the controller 110 may only be configured for communication with the HMI 108 to guard safety of mixing and delivering explosives. The communication interface 202 allows for real-time communication between the HMI 108 and the controller 110 while preventing external systems and devices from accessing the controller 110.

The HMI 108 includes one or more processors 206 operably coupled to one or more data storage devices 204, an electronic display 214, and one or more input devices 212. For simplicity the one or more processors 206, the one or more data storage devices 204, and the one or more input devices 212 are sometimes referred to herein as "processors" 206, "storage" 204, and "input devices" 212, respectively. By way of non-limiting example, the HMI 108 may include an industrial Personal Computer (PC) running an operating system (e.g., Microsoft Windows, etc.). The storage 204 includes a database 208 and a software application 210 stored thereon. The software application 210 comprises computer-readable instructions (e.g., the computer-readable instructions 606 of FIG. 6) configured to instruct the processors 206 to perform operations of the HMI 108. For example, the computer-readable instructions are configured to instruct the one or more processors to display a graphical user interface (GUI) (e.g., the GUI 402 of FIG. 4) on the electronic display 214.

The GUI may be configured to prompt a user to provide login credentials for secure access. For example, the GUI may present a login screen, based on the credentials entered by the user the one or more processors 206 may determine a security level associated with the operator and reconfigure the HMI 108 or the GUI of the HMI 108 to allow or deny access to parameters (e.g., explosive mixture, amount of explosive product to be used, delivery rate, etc.) based on the user's security level. For example, in some embodiments multiple levels of user authority are defined by the HMI 108. These may include operator, advanced operator, blast supervisor, blast engineer, and manufacturer. The HMI 108 may associate a minimum authority level with portions of the computer-readable instructions of the software application 210. If an operator does not have the minimum authority level, the operator will be unable to perform functions associated with portions of the computer-readable instructions of the software application 210. For example, to view a formula screen that shows the explosive mixture to be used, an authority level equivalent to an advanced operator or blast supervisor may be required. Further, to edit the explosive mixture, an authority level of blast engineer may be required.

The HMI 108 may be reconfigured or updated (hardware or software application 210) without the need to reconfigure or update the controller 110. Additional features may be added to the HMI 108 without the need to replace the controller 110. In some cases, reconfiguring the controller 110 may be difficult. Thus, adding features to the HMI 108 without affecting the controller 110 is desirable.

The GUI is further configured to prompt the user of the HMI 108 to provide, through the input devices 212, at least a portion of recipe information (e.g., the RECIPE/DELIVERY INFORMATION 316 of FIG. 3) for blending a mixture. The HMI 108 is configured to receive the user inputs through the input devices 212 (e.g., a mouse, a track pad, a keyboard, a button array, a sensor of a touchscreen device built into the electronic display 214, other input devices, or combinations thereof). By way of non-limiting example, the recipe information may include one or more blending speeds (e.g., auger speeds), quantities of one or more ingredients to add to the mixture, one or more pump pressures, one or more ingredient delivery rates to be used in blending the mixture (e.g., auger speed, pump speed) or preparing a particular ingredient, a total volume of mixture, critical safety inputs, an instruction to start blending the mixture, other information, or combinations thereof. The recipe information may also include mixture delivery information (e.g., total volume of mixture to be delivered, delivery rate of mixture, etc.).

The computer-readable instructions are also configured to instruct the processors 206 to generate one or more signals to transmit the recipe information from the HMI 108 to the controller 110 through the communication interface 202. The recipe information is configured to indicate to the controller 110 how to blend and/or deliver the mixture. The computer-readable instructions are further configured to instruct the processors 206 to process blending information (e.g., the BLENDING INFORMATION 322 of FIG. 3) received from the controller 110. The blending information includes information regarding the blending of the mixture. By way of non-limiting example, the blending information may include data from the sensors 114 that was taken during blending of the mixture, information indicating measured amounts of one or more ingredients delivered to the mixture, measured pumping pressures, measured ingredient delivery rates, other information, or combinations thereof. The computer-readable instructions are also configured to instruct the processors 206 to store the blending information in the database 208.

In some embodiments the controller 110 may include an Electrical Control Unit such as a Bosch Rexroth RC series controller. Similar to the HMI 108, the controller 110 includes one or more processors 218 and one or more data storage devices 216. For simplicity, the one or more processors 218 and the one or more data storage devices 216 are sometimes referred to herein as "processors" 218 and "storage" 216, respectively. The storage 216 is configured to store computer-readable instructions configured to instruct the processors 218 to perform operations of the controller 110.

The controller 110 is operably coupled to the sensors 114, the operator inputs 116, and the electrically controllable components 112. The controller 110 is configured to process the recipe information received from the HMI 108, and generate one or more control signals (e.g., the control signals 318 of FIG. 3) to transmit to the electrically controllable components 112 through one or more control outputs. The one or more control signals are based on the recipe information received from the HMI 108. In this way the controller 110 controls the electrically controllable components 112 to blend the mixture. The electrically controllable components 112 may include one or more hydraulic valves, one or more process control valves (e.g., pneumatic or electronic process valves), one or more auger motors, one or more pumps, or combinations thereof. In some embodiments, the controller 110 may control hose retraction and/or a hopper. In some embodiments, the controller may track tank levels of ingredients used for the mixture. In generating the control signals, the controller 110 may take into consideration the critical safety inputs received from the HMI 108 through the communication interface 202.

During blending of the mixture, the controller 110 may monitor the blending processing, and provide the blending information to the HMI 108 through the communication interface 202. To gather the blending information the controller 110 may use the sensors 114 to monitor the blending processing. The controller 110 may be configured to receive one or more sensor signals (e.g., the SENSOR SIGNALS 320 of FIG. 3) from the sensors 114. By way of non-limiting example, the sensors 114 may include one or more pressure sensors, one or more temperature sensors, one or more pump speed sensors, one or more auger motor speed sensors, level sensors, flow meters, other sensors, or combinations thereof. The controller 110 may be configured to generate one or more signals including blending information (e.g., the BLENDING INFORMATION 322 of FIG. 3) and transmit the blending information to the HMI 108. Once the blending processing is completed the controller 110 may be configured to generate one or more signals including final blending information (e.g., the FINAL BLENDING INFORMATION 324 of FIG. 3) to be transmitted to the HMI 108 through the communication interface 202. The final blending information may be configured to indicate final amounts of the ingredients that were delivered to the mixture during blending processing.

The HMI 108 and the controller 110 may perform operations independent of each other. For example, once the controller 110 receives the recipe information from the HMI 108, the controller 110 can perform the blending and delivery of the mixture independent of the HMI 108. As a result, the controller 110 may be capable of performing the blending and delivery even if communication with the HMI 108 is interrupted or otherwise terminated.

Additionally, the independence between the HMI 108 and the controller 110 may allow alterations of the HMI 108. For example, the HMI 108 may be replaced, the software application 210 may be updated, or the HMI 108 may be reconfigured for a user without the need to alter the controller 110. For example, the HMI 108 may provide a custom interface based on the operator's credentials. The custom interface may provide access to inputs or functions of the software application 210 associated with a minimum authority level that is equivalent to or less than the security level associated with the operator credentials.

In some embodiments the controller 110 may be located inside of an input/output (10) junction box.

In some embodiments, the bulk explosive loading system 100, further comprises a global positioning system (GPS). The HMI 108 or the controller 110 may track an amount of the explosive mixture used to fill a borehole and associate a coordinate from the GPS with the amount. The HMI 108 may compile data collected during use to generate a report and export the report. For example, the HMI may provide a delivery log of the amount of explosive mixture at each blasthole coordinate. This may allow an operator to determine blastholes where excess explosive mixture was placed, or blastholes where insufficient explosive mixture was placed. The HMI may also provide an overall delivery report that provides a total amount of explosive mixture delivered across multiple blastholes. Additionally, the delivery report may indicate how much of each product used in the explosive mixture was used. These reports may be used to determine billing based on amount of product used.

Figure 3:
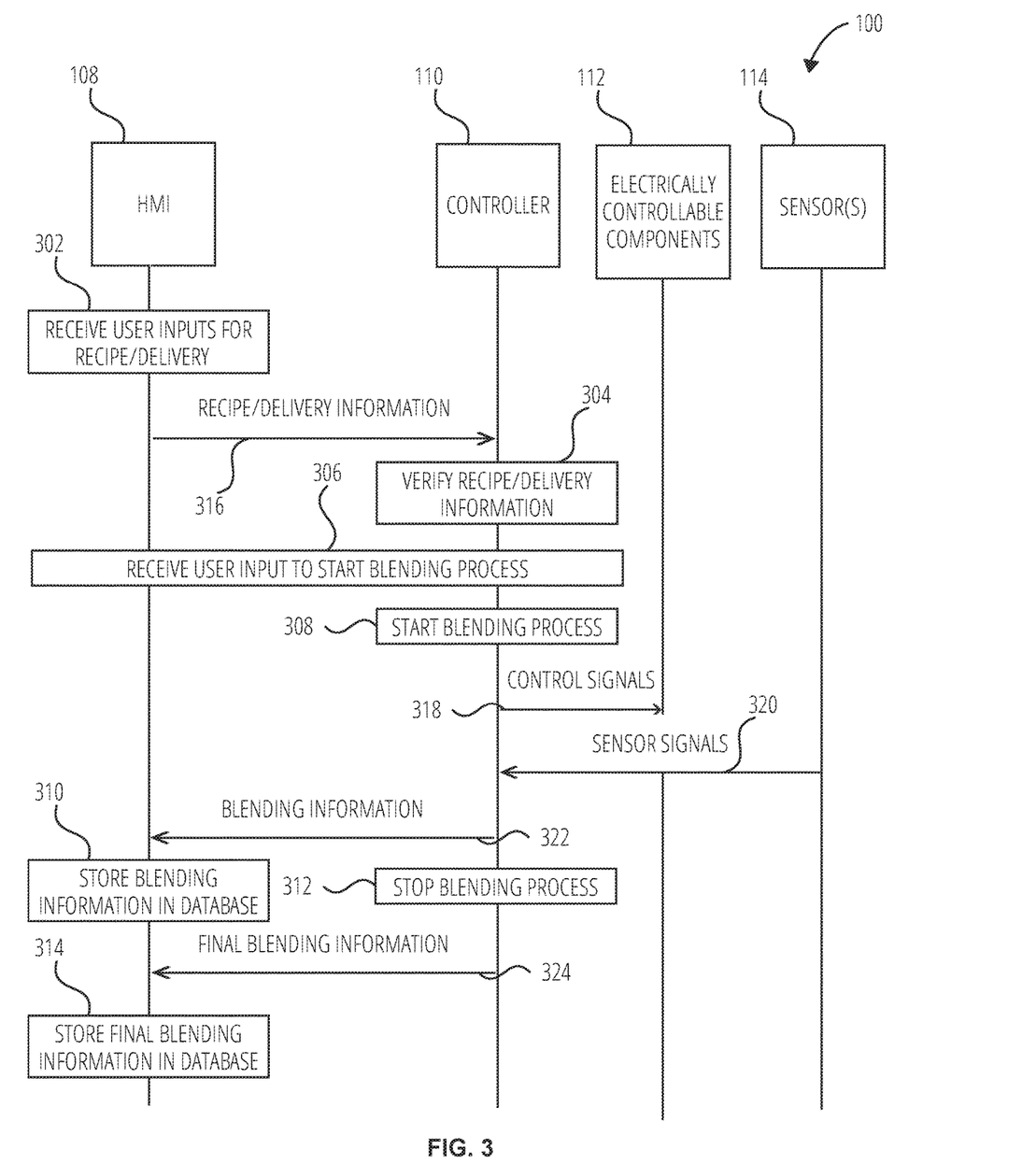
FIG. 3 is a simplified signal flow diagram of the bulk explosive loading system of FIG. 1.

FIG. 3 is a simplified signal flow diagram of the bulk explosive loading system 100 of FIG. 1. As previously discussed, the bulk explosive loading system 100 comprises an HMI 108, a controller 110, electrically controllable components 112, and sensors 114. In operation, the HMI 108 receives user inputs for at least a portion of RECIPE/DELIVERY INFORMATION 316 of a mixture to be blended. The HMI 108 is configured to transmit the RECIPE/DELIVERY INFORMATION 316 to the controller 110, and the controller 110 is configured to verify 304 the RECIPE/DELIVERY INFORMATION 316 received from the HMI 108. In some embodiments, the controller 110 is configured to transmit a ready signal to the HMI 108 to indicate that the controller is ready and able to begin blending the mixture.

A user input to start the blending process is received 306. For example, the user input may be received 306 through the user interface of the HMI 108, through the operator inputs 116, or both. If received by the HMI 108, the HMI 108 transmits the input to start to the controller 110. In some embodiments the user input to start the blending process may be a real-time or quasi real-time instruction to start the blending processes responsive to the user input. In some embodiments the user input may define a time for the start of the blending process, or a delay may be introduced from reception of the user input before the blending process begins. Responsive to the user input to start the blending process, the controller 110 may start 308 the blending process. As previously discussed, the blending and delivery process may continue without further communication with the HMI 108.

During the blending processing the controller 110 may transmit control signals 318 to the electrically controllable components 112 to control the blending process. Also during the blending processing, the controller 110 may receive SENSOR SIGNALS 320 from the sensors 114. During the blending process, the controller 110 may further generate and transmit, to the HMI 108, one or more signals including BLENDING INFORMATION 322. The HMI 108 receives and stores 310 the blending information in the database 208 (FIG. 2). The transmission of the control SENSOR SIGNALS 320, the SENSOR SIGNALS 320, and the BLENDING INFORMATION 322 may occur repeatedly during the blending process, may occur simultaneously or non-simultaneously, and may occur in various different chronological orders.

When the blending processing is complete, the controller 110 stops 312 the blending processing. The controller 110 generates one or more signals including FINAL BLENDING INFORMATION 324, and transmits the FINAL BLENDING INFORMATION 324 to the HMI 108. The HMI 108 stores 314 the FINAL BLENDING INFORMATION 324 in the database 208 (FIG. 2).

Figure 4:
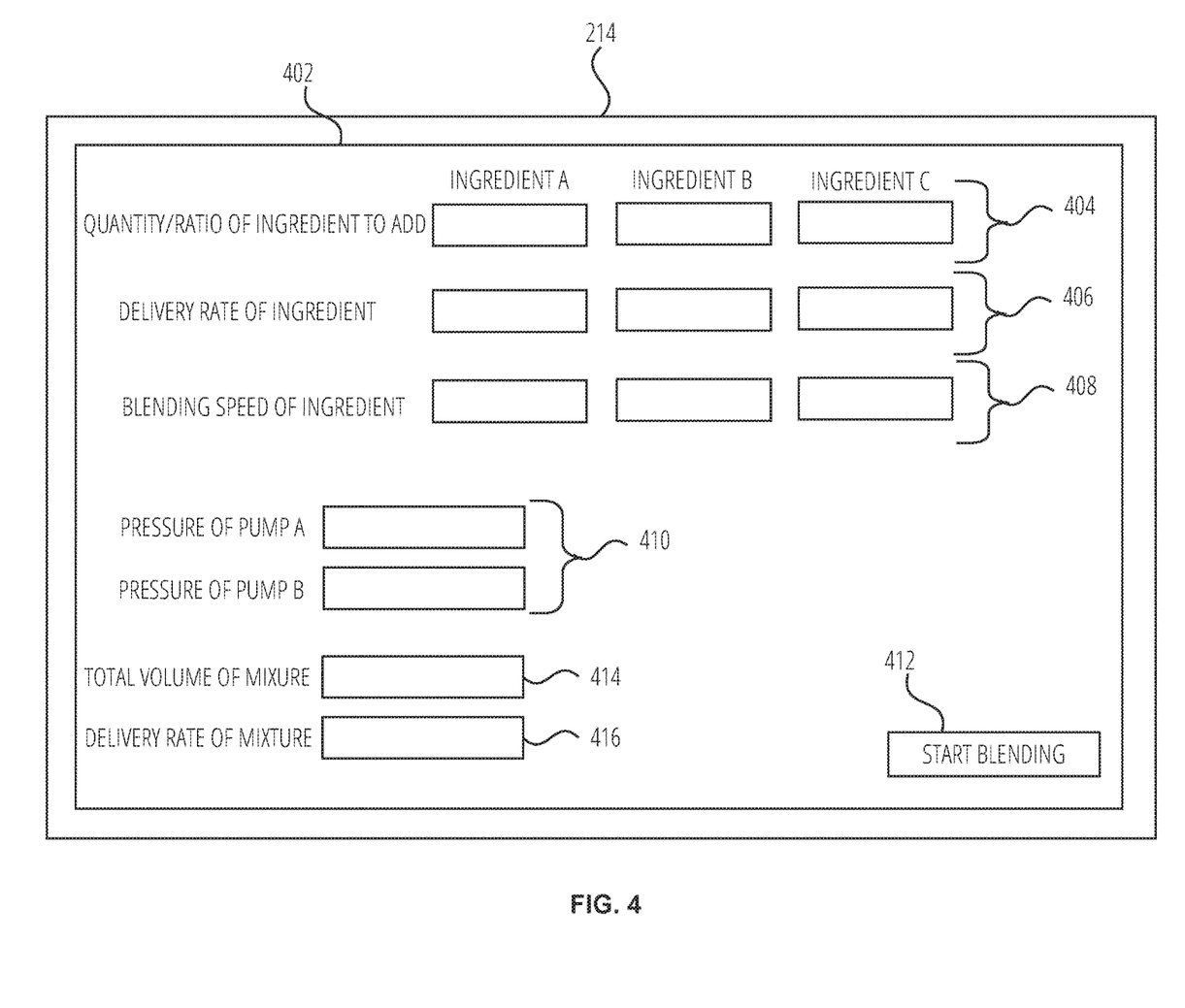
FIG. 4 is a simplified view of a graphical user interface (GUI) displayed by the electronic display of an HMI of the bulk explosive loading system of FIG. 1, according to some embodiments.

FIG. 4 is a simplified view of an example of a graphical user interface (GUI) 402 displayed by the electronic display 214 of the HMI 108 of the bulk explosive loading system 100 of FIG. 1, according to some embodiments. The GUI 402 includes one or more ingredient quantity/ratio inputs 404, one or more ingredient delivery rate inputs 406, one or more ingredient blending speed inputs 408, one or more pump pressure inputs 410, a total volume of mixture input 414, a delivery rate of mixture input 416, and a start blending option 412. Each of inputs 404, 406, 408 410, 414, 416 may be configured to enable a user to manually input quantities, select one or more quantities from a list (e.g., a dropdown list), or otherwise indicate desired quantities for input.

The ingredient quantity/ratio inputs 404 may be configured to enable the user to set or adjust the quantity or ratio (i.e., the ratio of a volume or mass of the ingredient to the volume or mass of the final mixture) of the ingredients in a recipe. By way of non-limiting example, an ingredient A may include an emulsion explosive. Emulsion explosives are commonly used in the mining, quarrying, and excavation industries. Emulsion agents are generally transported to a job site as an emulsion that is too dense to completely detonate. In general, the emulsion needs to be "sensitized" in order for the emulsion to detonate successfully. Sensitizing is often accomplished by introducing small voids into the emulsion (e.g., using a chemical gassing agent, as discussed below). These voids act as hot spots for propagating detonation. These voids may be introduced by blowing a gas into the emulsion and thereby forming gas bubbles, adding microspheres, other porous media, and/or injecting chemical gassing agents to react in the emulsion and thereby form gas. In some embodiments the ingredient quantity/ratio input 404 for ingredient A may enable the user to select between various densities of the emulsion explosive (e.g., densities of between about 0.6 to 1.4 in steps of 0.1) and in different quantities or ratios of the final mixture. For example, a user may select a density of 1.1 and a ratio of 60 percent of the final mixture, with the balance being ANFO, which in some embodiments may be ingredient B.

In some embodiments a chemical gassing agent may be used to react with the emulsion explosive (e.g., ingredient A). By way of non-limiting example, a chemical gassing agent may include peroxides such as hydrogen peroxide, inorganic nitrite salts such as sodium nitrite, nitrosamines such as N,N'-dinitrosopentamethylenetetramine, alkali metal borohydrides such as sodium borohydride and bases such as carbonates including sodium carbonate. Any chemical gassing agent known in the art and compatible with the emulsion explosive may be used. The chemical gassing agent may be dissolved in an aqueous solution.

The chemical gassing agent may be used to change the density of the emulsion explosive (e.g., ingredient A) to a desired density (e.g., to the density selected or otherwise input into the GUI 402 using the ingredient quantity/ratio input 404 for ingredient A). By way of non-limiting example, the software application 210 (FIG. 2) of the HMI 108 (FIGS. 1-3) may be configured determine how much of the chemical gassing agent to add to the emulsion explosive to achieve the desired density. Also by way of non-limiting example, the controller 110 (FIGS. 1-3) may be configured to determine how much of the chemical gassing agent to add to the emulsion explosive to achieve the desired density. As a further non-limiting example, the user may determine how much of the chemical gassing agent to add to the emulsion explosive and provide the determined amount to the HMI 108 through the GUI 402 or to the controller 110 through the operator inputs 116 (FIGS. 1-2). In embodiments where the HMI 108 or the controller 110 determines the amount of the chemical gassing agent to add, the HMI 108 or the controller 110 may be configured to use algorithms (e.g., equations) or lookup tables to determine the amount of the chemical gassing agent to add. These algorithms and lookup tables may take into consideration temperature of the emulsion matrix, which impacts the density of the final emulsion explosive. As a result, in embodiments where the HMI 108 or the controller 110 determines the amount of the chemical gassing agent to add, inputs from the sensors 114 (FIGS.

1-3) (e.g., temperature sensors) may be used in the determination of how much of the chemical gassing agent to add. In embodiments where the HMI 108 makes the determination, the temperature sensor information from the sensors 114 may be transmitted from by the controller 110 to the HMI 108 through the communication interface 202 (FIG. 2).

In some embodiments, a pH control agent such as an acid may be added to the emulsion explosive. Examples of acids include, but are not limited to, organic acids such as citric acid, acetic acid, and tartaric acid. Any pH control agent known in the art and compatible with the chemical gassing agent may be used. The pH agent may be dissolved in an aqueous solution. Similarly as discussed above with reference to the chemical gassing agent, the HMI 108, the user, or the controller 110 may determine an amount of the PH control agent to add to the emulsion. Sensor inputs may be used in conjunction with algorithms (e.g., equations) and/or lookup tables to determine the amount of the PH control agent to add to the emulsion.

As previously mentioned, in some embodiments ingredient B may include ANFO, which includes a mixture of blasting agents ammonium nitrate ($NH_4NO_3$) (AN) and fuel oil (e.g., number 2 fuel oil (FO)). For example, the ammonium nitrate may include porous prilled ammonium nitrate. The ingredient quantity/ratio input 404 for ingredient B may enable the user to select for ingredient B (e.g., ANFO) between various quantities or ratios of the final mixture.

In some embodiments, an ingredient C may also be used. In such embodiments, the ingredient quantity/ratio input 404 for ingredient C may enable the user to select for ingredient C between various quantities or ratios of the final mixture.

The ingredient delivery rate inputs 406 may be optional inputs (in other embodiments the HMI 108 or the controller 110 may automatically select delivery rates) that may be included in some embodiments of the GUI 402. In some such embodiments the ingredient delivery rate inputs 406 are configured to enable the user to set or adjust the rate of delivery of the ingredients. The ingredient blending speed inputs may also be optional inputs that may be included in some embodiments of the GUI 402. The ingredient blending speed inputs 408 are configured to enable the user to set or adjust the speed with which the ingredients are blended (e.g., the speed of a mixing auger). The pump pressure inputs may also be optional inputs that may be included in some embodiments of the GUI 402. The pump pressure inputs 410 are configured to enable the user to set or adjust pressures of pumps to be used in the blending and/or delivery processes. The start blending option 412 (also an optional input) is configured to enable the user to start the blending process from inside of the truck cab 104.

The total volume of blended mixture option 414 is configured to enable the user to set or select a total volume to be mixed and/or delivered. The delivery rate of mixture option 416 is configured to enable the user to set or select a rate of delivery or deployment of the final mixture to the blast site.

Using the ingredient quantity/ratio inputs 404, the total volume of mixture input 414, and the delivery rate of mixture input 416, the HMI 108 (FIGS. 1-3) may create recipes to be transmitted to the controller 110 (FIG. 1). In some embodiments, the HMI 108 may be configured to store these recipes for later user. In some embodiments, the GUI 402 may be configured to present previously used recipes for later inspection and adjustment using the ingredient quantity/ratio inputs 404, the total volume of mixture input 414, and the delivery rate of mixture input 416. In some embodiments, the HMI 108 may be configured to download pre-defined recipes from one or more servers (not shown) (e.g., through the internet). By way of non-limiting example, an ingredient manufacturer or mining/drilling company may provide various recipes online for use in the field. Also by way of non-limiting example, recipes may be shared from user to user via one or more social media platforms. These pre-defined recipes may be viewed and modified using the GUI 402.

Figure 5:
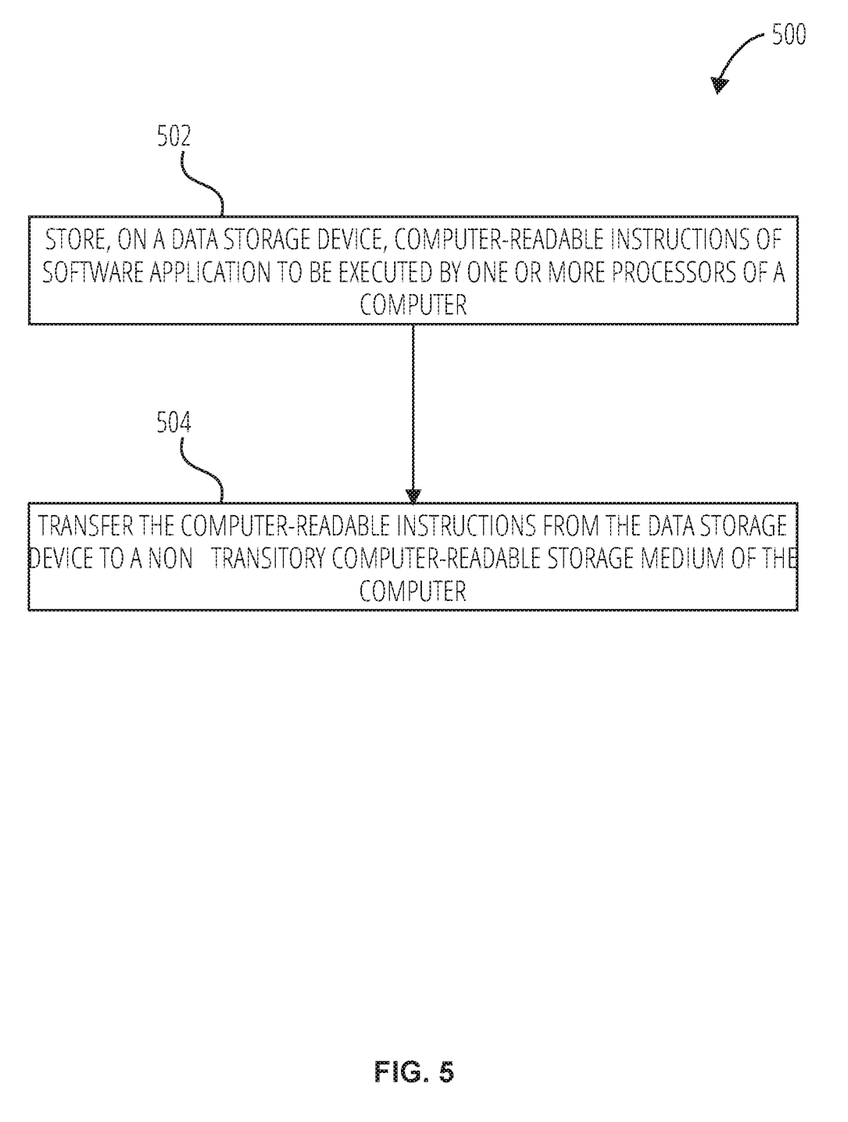
FIG. 5 is a simplified flowchart illustrating a method of transforming a computer into the HMI of the bulk explosive loading system of FIG. 1, according to some embodiments.

FIG. 5 is a simplified flowchart illustrating a method 500 of transforming a computer 604 (FIG. 6) into the HMI 108 of the bulk explosive loading system 100 of FIG. 1, according to some embodiments.

Figure 6:
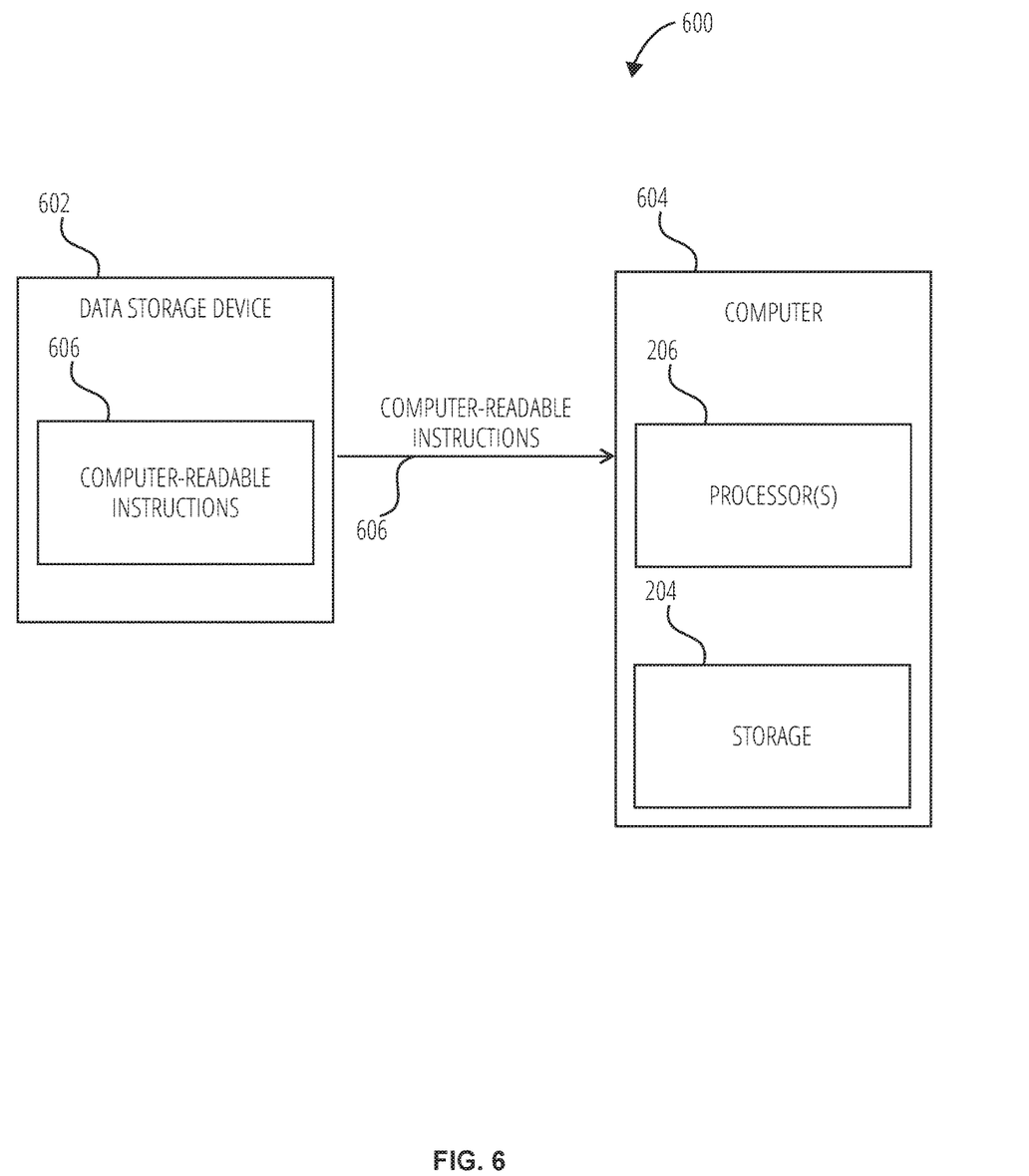
FIG. 6 is a simplified block diagram of a system illustrating the method of FIG. 5.

FIG. 6 is a simplified block diagram of a system 600 illustrating the method 500 of FIG. 5. Referring to FIGS. 5 and 6 together, the method 500 comprises storing 502, on a data storage device 602, computer-readable instructions 606 of a software application (e.g., the software application 210 of FIG. 2) to be executed by one or more processors 206 of the computer 604. In some embodiments the data storage device 602 is a data storage device of a software application delivery server (e.g., a server of a software application store such as iTunes or Google Play). In some embodiments the data storage device 602 comprises a distributable computer-readable medium such as a disc (e.g., a compact disc (CD), a digital versatile disc (DVD), a Blu-ray, a Flash drive, other distributable medium, or combinations thereof).

The method 500 also includes transferring 504 the computer-readable instructions 606 from the data storage device 602 to a non-transitory computer-readable storage medium (e.g., the storage 204) of the computer 604. In some embodiments transferring 504 the computer-readable instructions 606 from the data storage device 602 to the computer-readable non-transitory computer-readable storage medium of the computer 604 includes transmitting the computer-readable instructions 606 from a software application delivery server to the computer 604 through an Internet Protocol (IP) network. In some embodiments transferring 504 the computer-readable instructions 606 from the data storage device 602 to the computer-readable non-transitory computer-readable storage medium of the computer 604 includes shipping the data storage device 602 to enable physical connection of the data storage device to the computer 604.

The computer-readable instructions 606 are configured to transform the computer 604 into the HMI 108. Accordingly, the computer-readable instructions 606 are configured to instruct the processors 206 to perform the functions of the HMI 108, as discussed above. For example, the computer-readable instructions 606 are configured to instruct the processors 206 to display a GUI (e.g., the GUI 402 of FIG. 4). The GUI is configured to prompt a user of the HMI 108 to provide, through one or more user input devices (e.g., input devices 212 of FIG. 2) at least a portion of recipe information for blending a mixture. The recipe information can include one or more blending speeds, quantities/ratios of one or more ingredients to add to the mixture, a total volume of mixture, and a delivery rate of the mixture.

The computer-readable instructions 606 are also configured to instruct the processors 206 to transmit the recipe information from the HMI 108 through a communication interface (e.g., the communication interface 202 of FIG. 2) to the controller 110 (FIGS. 1-3). The recipe information is configured to indicate to the controller 110 how to blend the mixture. In some embodiments, the computer-readable instructions 606 are also configured to instruct the processors 206 signal to the controller 110 to start blending and/or delivering the mixture according to the recipe information. In some embodiments the computer-readable instructions 606 are configured to instruct the processors 206 to transmit, to the controller 110, critical safety constraints for blending the mixture.

The computer-readable instructions 606 are further configured to instruct the processors 206 to process blending information received from the controller 110 through the communication interface. The blending information includes information regarding the blending of the mixture. In some embodiments the blending information includes data from one or more sensors (e.g., the sensors 114 of FIGS. 1-3). By way of non-limiting example the one or more sensors may include one or more pressure sensors, one or more temperature sensors, one or more pump speed sensors, one or more auger motor speed sensors, other sensors, or combinations thereof. The computer-readable instructions 606 are configured to instruct the processors 206 to store the blending information in one or more databases (e.g., the database 208 of FIG. 2) stored in storage 204 of the computer 604. In some embodiments the computer-readable instructions 606 are configured to instruct the processors 206 to process and store final blending information received from the controller 110. The final blending information may indicate final measured amounts of one or more ingredients delivered to the mixture.

It should be understood by those having skill in the art that many changes may be made to the details of the above-described embodiments without departing from the underlying principles of the disclosure. The scope of the present disclosure should, therefore, be determined only by the following claims.

What is claimed is:

1. A controller of a bulk explosive loading system, the controller comprising:
   a communication interface configured to communicate with a human-machine interface (HMI) device, the HMI device configured to execute a software program configured to enable the HMI to receive user inputs from a user of the bulk explosive loading system;
   one or more control outputs configured to output one or more control signals to one or more electrically controllable components of the bulk explosive loading system;
   one or more sensor inputs configured to receive one or more sensor signals from one or more sensors configured to monitor the bulk explosive loading system;
   one or more processors; and
   one or more data storage devices to store computer-readable instructions configured to instruct the one or more processors to:
   process recipe information received from the HMI device through the communication interface, the recipe information configured to indicate to the controller how to blend a mixture;
   generate the one or more control signals based on the recipe information to control the one or more electrically controllable components to blend the mixture;
   process the one or more sensor signals received during blending of the mixture; and
   control the communication interface to transmit blending information to the HMI device for display, the blending information including information regarding the blending of the mixture, wherein the blending information transmitted to the HMI device for display comprises pumping pressures, ingredient delivery rates, or combinations of thereof.

2. The controller of claim 1, wherein the user inputs received from the user by the HMI include a blending speed input, a total volume of mixture input, a recipe input, or combinations thereof.

3. The controller of claim 1, wherein the recipe information includes quantities of ingredients to be blended into the mixture, ratios of ingredients to total mixture, ingredient delivery rates to be used in blending the ingredients, other instructions for blending the ingredients, instructions for delivering the mixture to a blast site, critical safety inputs, an instruction to start blending the mixture, or combinations thereof.

4. The controller of claim 1, wherein the one or more electrically controllable components comprise one or more hydraulic valves, one or more auger motors, one or more pumps, one or more process control valves, or combinations thereof.

5. The controller of claim 1, wherein the one or more sensors comprise one or more pressure sensors, one or more temperature sensors, one or more pump speed sensors, one or more auger motor speed sensors, level sensors, flow meters, or combinations thereof.

6. The controller of claim 1, wherein the one or more control signals are configured to control the one or more electrically controllable components to blend the mixture according to closed-loop control of each ingredient to be blended into the mixture.

7. The controller of claim 1, wherein the blending information further comprises information indicating an amount of one or more ingredients delivered to the mixture.

8. The controller of claim 1, wherein the one or more processors are further configured to control the communication interface to transmit final blending information to the HMI, the final blending information indicating final amounts of one or more ingredients delivered to the mixture.

9. The controller of claim 1, wherein the one or more processors are configured to complete a blending of the mixture once the recipe information is received even if communication with the HMI device is terminated.

10. The controller of claim 1, wherein the mixture comprises at least one of an emulsion explosive or ammonium nitrate fuel oil (ANFO).

11. A controller of a bulk explosive loading system, the controller comprising:
    a communication interface configured to communicate with a human-machine interface (HMI) device, the HMI device configured to execute a software program configured to enable the HMI to receive user inputs from a user of the bulk explosive loading system;
    one or more control outputs configured to output one or more control signals to one or more electrically controllable components of the bulk explosive loading system;
    one or more sensor inputs configured to receive one or more sensor signals from one or more sensors configured to monitor the bulk explosive loading system;
    one or more processors; and
    one or more data storage devices to store computer-readable instructions configured to instruct the one or more processors to:
    process recipe information and delivery information received from the HMI device through the communication interface, the recipe information configured to indicate to the controller how to blend a mixture, the delivery information to enable the one or more processors to properly deliver the mixture to a blast site;

verify the recipe information and the delivery information received from the HMI device;
receive user input to start a blending process after verifying the recipe information and the delivery information;
generate the one or more control signals based on the recipe information to control the one or more electrically controllable components to blend the mixture;
process the one or more sensor signals received during blending of the mixture; and
control the communication interface to transmit blending information to the HMI device for display, the blending information including information regarding the blending of the mixture.

12. The controller of claim 11, wherein the one or more control signals are configured to control the one or more electrically controllable components to blend the mixture according to closed-loop control of each ingredient to be blended into the mixture.

13. The controller of claim 11, wherein the blending information comprises information indicating an amount of one or more ingredients delivered to the mixture, pumping pressures, ingredient delivery rates, or combinations thereof.

14. The controller of claim 11, wherein the one or more processors are further configured to control the communication interface to transmit final blending information to the HMI, the final blending information indicating final amounts of one or more ingredients delivered to the mixture.

15. The controller of claim 11, wherein the one or more processors are configured to complete a blending of the mixture once the recipe information is received even if communication with the HMI device is terminated.

16. The controller of claim 11, wherein the mixture comprises at least one of an emulsion explosive or ammonium nitrate fuel oil (ANFO).

17. A controller of a bulk explosive loading system, the controller comprising:
a communication interface configured to communicate with a human-machine interface (HMI) device, the HMI device configured to execute a software program configured to enable the HMI to receive user inputs from a user of the bulk explosive loading system;
one or more control outputs configured to output one or more control signals to one or more electrically controllable components of the bulk explosive loading system;
one or more sensor inputs configured to receive one or more sensor signals from one or more sensors configured to monitor the bulk explosive loading system;
one or more processors; and
one or more data storage devices to store computer-readable instructions configured to instruct the one or more processors to:
process recipe information received from the HMI device through the communication interface, the recipe information configured to indicate to the controller how to blend a mixture;
verify the recipe information received from the HMI device, wherein verifying the recipe information includes verifying instructions for delivering the mixture to a blast site and critical safety inputs;
generate the one or more control signals based on the recipe information to control the one or more electrically controllable components to blend the mixture,
continue to blend the mixture once the recipe information is received even if communication with the HMI device is interrupted;
process the one or more sensor signals received during blending of the mixture; and
control the communication interface to transmit blending information to the HMI device for display, the blending information including information regarding the blending of the mixture.

18. The controller of claim 17, wherein the user inputs received from the user by the HMI include a blending speed input, a total volume of mixture input, a recipe input, or combinations thereof.

19. The controller of claim 17, wherein the recipe information includes quantities of ingredients to be blended into the mixture, ratios of ingredients to total mixture, ingredient delivery rates to be used in blending the ingredients, other instructions for blending the ingredients, instructions for delivering the mixture to a blast site, critical safety inputs, an instruction to start blending the mixture, or combinations thereof.

20. The controller of claim 17, wherein the one or more electrically controllable components comprise one or more hydraulic valves, one or more auger motors, one or more pumps, one or more process control valves, or combinations thereof.

* * * * *